US012755525B2

(12) United States Patent
Kong et al.

(10) Patent No.: US 12,755,525 B2
(45) Date of Patent: Oct. 6, 2026

(54) METHOD FOR COMPLEX TARGET IDENTIFICATION FROM MASS VIDEOS BASED ON HUMAN-MACHINE COLLABORATION

(71) Applicant: Hangzhou Dianzi University, Hangzhou City (CN)

(72) Inventors: Wanzeng Kong, Hangzhou City (CN); Jiabin Zhu, Hangzhou City (CN); Jianan Han, Hangzhou City (CN); Xuanyu Jin, Hangzhou City (CN); Li Zhu, Hangzhou City (CN)

(73) Assignee: Hangzhou Dianzi University, Hangzhou City (CN)

( * ) Notice: Subject to any disclaimer, the term of this patent is extended or adjusted under 35 U.S.C. 154(b) by 361 days.

(21) Appl. No.: 18/491,305

(22) Filed: Oct. 20, 2023

(65) Prior Publication Data

US 2024/0290084 A1 Aug. 29, 2024

(30) Foreign Application Priority Data

Feb. 21, 2023 (CN) ......................... 202310142739.5

(51) Int. Cl.
*G06V 10/74* (2022.01)
*G06V 10/26* (2022.01)
(Continued)

(52) U.S. Cl.
CPC ............ *G06V 10/945* (2022.01); *G06V 10/26* (2022.01); *G06V 10/761* (2022.01);
(Continued)

(58) Field of Classification Search
CPC .... G06V 2201/07; G06V 10/25; G06V 40/10; G06V 40/197; G06V 20/53; G06V 20/52;
(Continued)

(56) References Cited

U.S. PATENT DOCUMENTS

2018/0089531 A1* 3/2018 Geva ...................... G06N 3/088
2022/0051039 A1* 2/2022 Chowdhury ............. G06N 3/04

OTHER PUBLICATIONS

Alexandre Franco, "A coarse-to-fine deep learning for person re-identification", 2016 (Year: 2016).*
Guan'an Wang, "Faster Person Re-Identification: One-Shot-Filter and Coarse-to-Fine Search", May 2024 (Year: 2024).*

(Continued)

*Primary Examiner* — Andrew W Bee
*Assistant Examiner* — Caleb L Esquino
(74) *Attorney, Agent, or Firm* — Victor Cardona, Esq; Heslin Rothenberg Farley & Mesiti P.C.

(57) ABSTRACT

The present disclosure provides a method for complex target retrieval from mass videos based on human-machine collaboration. At present, an intelligent system based on machine vision is weak in generalization ability. When an environment changes or a target is shielded or camouflaged, target retrieval from mass videos requires lots of manpower, which is time-consuming and labor-consuming. In the present disclosure, prescreening is performed in a video library using a retrieval model according to a coarse-grained feature of a target, and a candidate target set obtained by screening is made into a brain-eye synergistic rapid serial visual presentation (RSVP) paradigm for presentation for a user. After the user determines the target, a specific feature thereof is input to the retrieval model to realize rapid location and tracking of the target in mass videos.

10 Claims, 2 Drawing Sheets

(51) Int. Cl.
*G06V 10/776* (2022.01)
*G06V 10/778* (2022.01)
*G06V 10/82* (2022.01)
*G06V 10/94* (2022.01)
*G06V 20/40* (2022.01)

(52) U.S. Cl.
CPC .......... *G06V 10/776* (2022.01); *G06V 10/778* (2022.01); *G06V 10/82* (2022.01); *G06V 20/41* (2022.01); *G06V 20/46* (2022.01); *G06V 20/49* (2022.01)

(58) Field of Classification Search
CPC .... G06F 3/015; G06F 3/013; G06F 2203/011; A61B 5/369; A61B 5/386
See application file for complete search history.

(56) References Cited

OTHER PUBLICATIONS

Anguo Zhang, "Coarse-to-Fine Person Re-Identification with Auxiliary-Domain Classification and Second-Order Information Bottleneck", 2021 (Year: 2021).*
Nazia Perwiaz, "Person Re-Identification Using Hybrid Representation Reinforced by Metric Learning", Dec. 2018 (Year: 2018).*
Liangwei Fan, "DC-tCNN: A Deep Model for EEG-Based Detection of Dim Targets", Jun. 2022 (Year: 2022).*
Jianan Han, "Brain-Eye Collaboration Target Detection and Localization in Remote Sensing Image", Aug. 2025 (Year: 2025).*
Jianting Shi, "Low-Quality Video Target Detection Based on EEG Signal Using Eye Movement Alignment", Jul. 2024 (Year: 2024).*

* cited by examiner

METHOD FOR COMPLEX TARGET IDENTIFICATION FROM MASS VIDEOS BASED ON HUMAN-MACHINE COLLABORATION

CROSS REFERENCE TO RELATED APPLICATION

This patent application claims the benefit and priority of Chinese Patent Application No. 202310142739.5, filed with the China National Intellectual Property Administration on Feb. 21, 2023, the disclosure of which is incorporated by reference herein in its entirety as part of the present application.

TECHNICAL FIELD

The present disclosure belongs to the technical field of video target retrieval and relates to a method for target identification from mass videos based on human-machine collaboration.

BACKGROUND

With the development of the modern society, monitoring cameras have become indispensable devices for fighting crimes and terrorism, and therefore, the number of the monitoring cameras is always increasing rapidly. A city-scale monitoring network may rapidly generate a mass of video data. How to rapidly locate and track a given target in a mass video library has become a challenge at present.

Benefited from the progress of the artificial intelligence technology, studies on a video target detection technique based on machine learning have received extensive attention and achieved a series of excellent outcomes, such as two-stage target detection frameworks: a region-based convolutional neural network (R-CNN), a Fast R-CNN, and a Faster R-CNN, and faster single-stage target detection frameworks: you only look once (YOLO) and single shot detection (SSD). Although a computer is capable of rapid retrieval and long-time stable operation, most intelligent methods based on machine vision are driven by data and thus are weak in generalization ability. When an environment changes or a target is shielded or camouflaged, a machine vision model may not be used to perform a target retrieval task in place of human. Human brain has strong generalized reasoning ability and visually makes a rapid response to a seen image. However, if mass video information is only examined manually, this process may be time-consuming, labor-consuming, and low in efficiency. Moreover, it is very easy to cause visual fatigue of an examiner who browses videos for a long time, and even to cause visual impairment, which may affect the working quality and harm the physical health.

If a hybrid intelligent retrieval system is established by combining advantages of machine intelligence and human intelligence can be combined in a complementary and synergetic manner, the system will achieve better effects than any single intelligent mode. Compared with machine efficiency, the retrieval efficiency of human becomes a key factor limiting the performance of the hybrid intelligent system. Benefited from the development of the brain-machine interface technology, people are allowed to exchange information with an external environment by directly decoding brain activity. This makes efficient target retrial possible. Therefore, a method for complex target identification from mass videos based on human-machine collaboration is provided to improve the target retrieval efficiency in a scenario of mass videos.

SUMMARY

In view of the shortcomings of the prior art, an targetive of the present disclosure is to provide a method for complex target identification from mass videos based on human-machine collaboration. A complex target retrieval task in a scenario of mass videos is completed by fusing human intelligence with machine intelligence.

A method for complex target identification from mass videos based on human-machine collaboration includes the following steps:

step 1: establishing and training a target detection model and a reidentification model;

step 2: preprocessing monitoring videos; extracting video frame images from retrieved monitoring video data; performing detection analysis on the video frame images using the target detection model, and framing and clipping a target in the video frame images to obtain cropped images; and extracting a feature of the target in the cropped images using the reidentification model;

step 3: establishing and calibrating electroencephalogram (EEG) classification model; and determining, by the EEG classification model, whether a user from which an EEG signal is collected observes the target; and step 4: performing target retrieval from the videos based on human-machine collaboration, specifically including:

step 4-1, prescreening, by using the reidentification model, the cropped images identified by the target detection model according to a coarse-grained feature of the target; selecting n cropped images according to a confidence level by the reidentification model; and extracting the video frame image corresponding to the cropped images;

step 4-2, providing the video frame images obtained after the prescreening in step 4-1 for viewing by the user; recording an EEG signal and eye movement information while the user views the video frame images; preprocessing the obtained EEG signal and then inputting the preprocessed EEG signal to the EEG classification model; when the EEG classification model determines that the user observes the target, processing eye movement data of the user, extracting regions of interest for the user from the video frame images; and extracting a candidate target set from the regions of interest;

step 4-3, selecting a plurality of target images finally needing to be retrieved from the candidate target set obtained in step 4-2; and step 4-4, extracting a feature from each target image obtained in step 4-3 using the reidentification model, and performing similarity matching on the feature extracted from each target image and features of the video frame images in the retrieved monitoring video data; and taking each video frame image corresponding to the feature having a similarity exceeding a threshold as an image in which the target is present (i.e., a retrieval result).

Preferably, the target detection model in step 1 is a Faster region-based convolutional neural network (R-CNN) model retrained with a common target in context (CoCo) dataset. The target detection model is trained for a total of 12 rounds and optimized using a stochastic gradient descent optimizer with a learning rate set to 0.005.

Preferably, the reidentification model in step 1 is a ResNet50 model; and an average pooling layer in the ResNet50 model is changed to an adaptive average pooling layer.

Preferably, dimensions of a feature vector of the reidentification model are 512.

Preferably, the step 3 specifically includes:

step 3-1: preparing stimulus images of a plurality of test blocks in advance, where each test block includes a plurality of trials, and each trial includes a plurality of images;

step 3-2: presenting the stimulus images for the user and collecting EEG data;

step 3-3: preprocessing the collected EEG data; and step 3-4: establishing the EEG classification model based on deep learning to perform binary classification on an EEG signal; training the EEG classification model by way of decoupling representation learning, where the training of the EEG classification model is divided into two phases; a feature extractor is trained at a first phase, and a classifier is trained at a second phase.

Preferably, among the images of each trial in step 3-1, a ratio of a number of stimulus images including the target to a number of stimulus images excluding the target is 1:10.

Preferably, in step 3-2, there is a fixation time of 5 s before each trial starts; after the trial starts, each stimulus image is presented for 500 ms; after each trial ends, the user takes a rest for 10 s; the user is allowed to take a rest for any duration between two test blocks; and when the stimulus images are presented for the user, at least one stimulus image excluding the target is presented between two adjacent stimulus images including the target.

Preferably, the preprocessing in step 3-3 includes: using a 2-40 Hz band-pass filter to remove a voltage drift and high-frequency noise in the EEG signal, and downsampling the EEG signal to 100 Hz; and intercepting as a sample an EEG signal with a duration of 1 s starting from presentation of each stimulus image from the downsampled EEG signal.

Preferably, the training the EEG classification model in step 3-4 includes:

step 3-4-1: constructing a triplet sample, where to train the feature extractor using a triplet loss function, a triplet needs to be constructed as a training sample $x=\{x_{anchor}, x_{positive}, x_{negative}\}\in\mathbb{R}^{T\times C}$; $x_{anchor}$ sample and $x_{positive}$ sample belong to a same category; and $x_{negative}$ sample belongs to another category;

step 3-4-2: training the feature extractor to extract spatiotemporal information of the EEG data, where the feature extractor is composed of a multilayer perceptron and a recurrent network layer; the multilayer perceptron is constructed by connecting four fully connected layers, an exponential linear unit (ELU) activation function, and a residual; and the recurrent network layer is a long short-term memory (LSTM) network;

a feature houtput by the feature extractor is:

$$\bar{x}_i = \sigma[W_2\sigma(W_1x_i) + x_i]$$

$$\hat{x}_i = \sigma[W_4\sigma(W_3x_i) + \bar{x}_i]$$

$$h_i = LSTM(\hat{x}_i)$$

where $W_1\in\mathbb{R}^{C\times C}$, $W_2\in\mathbb{R}^{C\times C_1}$, $W_3\in\mathbb{R}^{C\times C_1}$, and $W_4\in\mathbb{R}^{C\times C_1}$ represent weights of the fully connected layers; $\sigma$ represents the ELU activation function; $x_i$ represents an element in the triplet sample, i=anchor, positive, negative; and $\bar{x}_i$ and $\hat{x}_i$ represent an intermediate layer output and a final output of the multilayer perceptron, respectively;

planarizing the feature h and using a projection layer to map the feature h to a low-dimensional sample space to obtain a feature projection $$h_i'$$

as follows:

$$h_i' = W_6ELU(W_5h_i + b_5) + b_6$$

where $W_5\in\mathbb{R}^{C_1T\times 64}$, $W_6\in\mathbb{R}^{64\times 16}$, $b_5$, and $b_6$ represents weights of the projection layer; calculating a similarity between the feature projections $$h_i'$$

of different samples, where the similarity dis(a, b) between the feature projections a and b of any two samples of the triplet sample is expressed as:

$$dis(a, b) = \|a - b + \epsilon e\|_2$$

where $\in$ represents a preset parameter; and e represents an all-one vector; and training the feature extractor using the triplet loss function, where the triplet loss function L is defined as follows:

$$L = \max\{dis(h'_{anchor}, h'_{positive}) - dis(h'_{anchor}, h'_{negative}) + \text{margin}, 0\}$$

where margin represents a minimum distance between positive and negative samples;

step 3-4-3: resampling the training sample, a number of samples in an EEG data sample space X after resampling is M;

step 3-4-4: training the classifier, where the classifier is composed of one fully connected layer, defined as follows:

$$\hat{y} = W_0x + b_0$$

where $\hat{y}$ represents a predicted label of the classifier; $W_0$ represents a weight matrix; and $b_0$ represents a bias term; and training the classifier by minimizing a cross-entropy loss function, as shown in the following formula:

$$\min_{\delta} L = \sum_{i=1}^{M} -y_i\cdot\log(\hat{y}_i)$$

where $\hat{y}_i$ represents a predicted label of the classifier for the ith sample; y represents a true label of the ith sample; and M represents the number of samples in the EEG data sample space X after resampling; and the classifier is trained using an Adam optimizer.

Preferably, the processing eye movement data in step 4-2 specifically includes:

step 4-2-1: extracting fixation points in original eye movement data and identifying the fixation points as a set of continuous points within a particular dispersion degree;

where the extracting fixation points includes: firstly ranking eye movement points in a sequence of time and then using a sliding window to scan continuous eye movement points;

determining an initial size of the sliding window by a duration threshold, and calculating a dispersion degree D of the eye movement points within the sliding window by the following formula:

$$D = [\max(x) - \min(x)] + [\max(y) - \min(y)]$$

where max(x) and min(x) represent horizontal coordinates of a leftmost eye movement point and a rightmost eye movement point within a plane, and max(y) and min(y) represent vertical coordinates of an uppermost eye movement point and a lowest eye movement point within the plane;

if the dispersion degree is less than a threshold, adding next eye movement point to the sliding window until the dispersion degree is greater than the threshold; at this time, calculating average values of coordinates of the eye movement points in the sliding window as coordinates of one fixation point; when the dispersion degree is greater than the threshold, moving the sliding window rightwards and recalculating a separation degree; and repeating the process until scanning of all the eye movement points is completed;

step 4-2-2: calculating a Euclidean distance of every two fixation points of the fixation points extracted in step 4-2-1 and generating a plurality of regions of interest using a density-based clustering algorithm according to the following formula:

$$d(F_i, F_j) = \sqrt{(x_i - x_j)^2 + (y_i - y_j)^2}$$

where $F_i$ and $F_j$ represent two different fixation points; $(x_i, y_i)$ and $(x_j, y_j)$ represent coordinates of the fixation points $F_i$ and $F_j$, respectively; and if a distance d between two fixation points is less than a threshold $d_\in$, averaging the coordinates of the two fixation points to generate a new fixation point;

step 4-2-3: for each stimulus image, selecting a last generated region of interest as a target region determined by human vision; and step 4-2-4: comparing a framed region identified by the target detection model with the target region determined by the human vision, selecting the framed region closest to the target region determined by the human vision as a final target region, and adding the final target region to the candidate target set.

The present disclosure has following beneficial effects:

The present disclosure combines the respective advantages of the human intelligence and the machine intelligence, makes up for inherent defects of low efficiency of artificial identification and weak generalization ability of the machine intelligence, can effectively improve video investigation efficiency and accuracy in the scenario of mass videos, and has great social significance.

DETAILED DESCRIPTION OF THE EMBODIMENTS

The following further describes the present disclosure with reference to the accompanying drawings.

Figure 1:
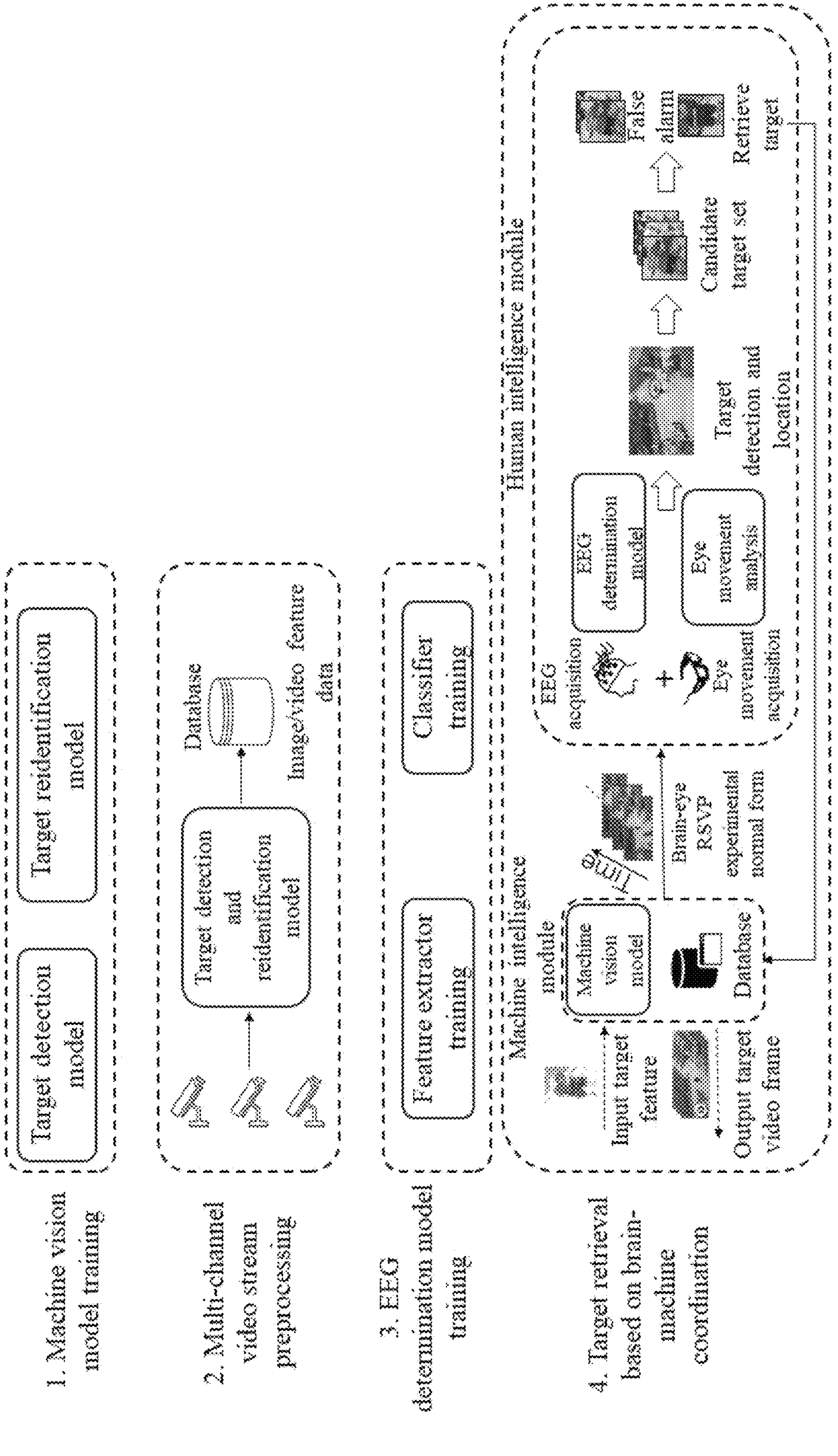
FIG. 1 is a flowchart of a method for complex target identification from mass videos based on human-machine collaboration according to the present disclosure.

As shown in FIG. 1, a method for complex target identification from mass videos based on human-machine collaboration specifically includes the following steps.

Step 1: a target detection model and a reidentification model based on deep learning are established and trained.

Step 1-1: the target detection model based on deep learning is trained. On the basis of a pretrained Faster R-CNN model provided by PyTorch, a CoCo dataset is used for retraining to fine adjust the target detection model. The target detection model is trained for a total of 12 rounds and optimized using a stochastic gradient descent optimizer with a learning rate set to 0.005.

Step 1-2: the reidentification model based on deep learning is trained. A pretrained ResNet50 model provided by PyTorch is used as a backbone network of the reidentification model to achieve a better image feature extraction effect. Market-1501 is used as a training dataset for the reidentification model. Since the Market-1501 dataset contains only 751 types of data, a classifier structure of the reidentification model needs to be changed so that the reidentification model can be trained. Meanwhile, an average pooling layer in the ResNet50 model is changed to an adaptive average pooling layer. The reidentification model is iteratively trained for a total of 60 rounds and optimized using the stochastic gradient descent optimizer with a learning rate set to 0.05.

Step 2: monitoring videos are preprocessed.

Video frame images are extracted from existing monitoring video data at a frequency of one frame per second. Detection analysis is performed on the video frame images using the target detection model obtain in step 1-1, and a target in the video frames is framed and cropped according to a region recommendation provided by the target detection model. A feature of the target in cropped images is extracted using the reidentification model in step 1-2.

Step 2-1: for a monitoring video with a high frame rate, since adjacent video frames almost have no difference, to improve the retrieval efficiency, the video frames are sampled at a frequency of one frame per second and saved locally. A video frame is named as: video name_current frame number.jpg.

Step 2-2: detection analysis is performed on the video frame images using the target detection model trained in step 1-1. The target detection model outputs a corresponding region recommendation according to a type of the target to be retrieved, and the target at a corresponding position in the video frame is cropped according to the region recommendation and saved locally, and the cropped image is named as: video name_current frame number_current target number-.jpg.

Step 2-3: features are extracted from all the cropped images of the target in step 2-2 using the reidentification model trained in step 1-2. Dimensions of a feature vector are 512. The features are saved locally in a dictionary manner: a key is a cropped image name, and a value is the feature vector of the cropped image. An image feature file is named as: pic_feature.mat.

Step 3: an EEG classification model is calibrated.

Figure 2:
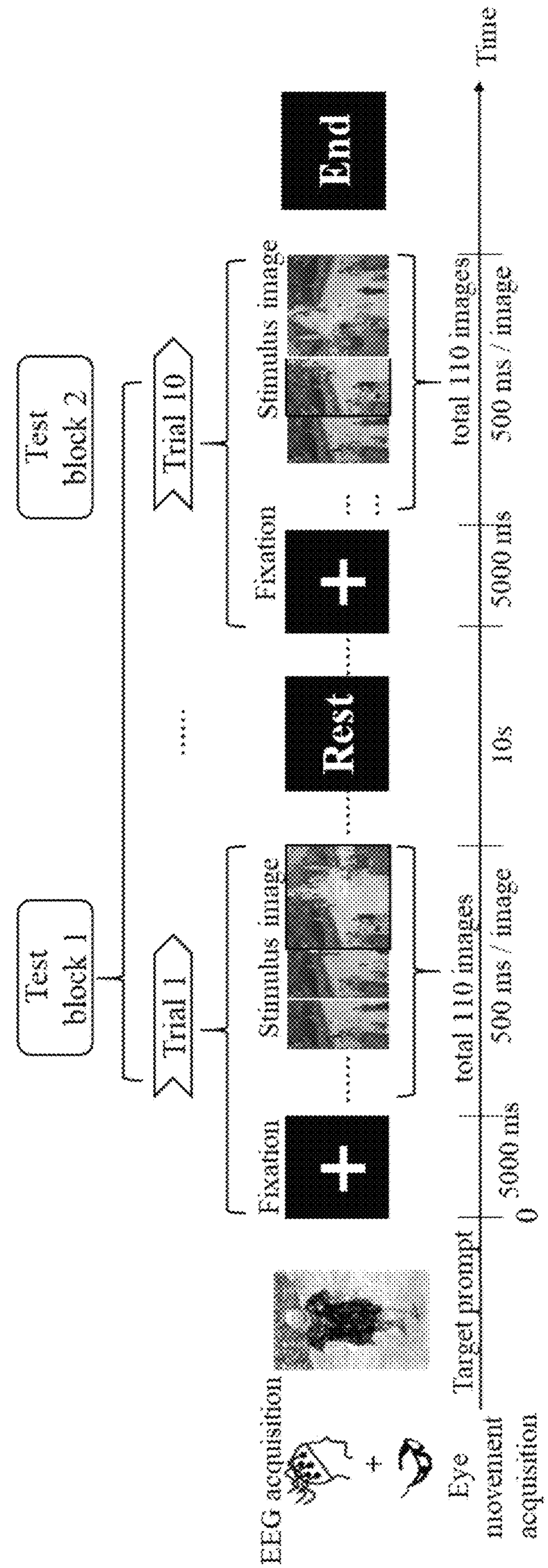
FIG. 2 is a design diagram of a brain-eye synergistic rapid serial visual presentation (RSVP) paradigm in a method for complex target identification from mass videos based on human-machine collaboration according to the present disclosure.

Stimulus images prepared in advance are made into the RSVP target detection paradigm shown in FIG. 2 and used to calibrate the EEG classification model. In this step, only an EEG signal needs to be collected and eye movement data does not need to be recorded.

Step 3-1: the stimulus images of two test blocks are prepared in advance, where each test block includes 10 trials, and each trial includes 110 images, including a total of 10 stimulus images including the target. During stimulus presentation, it needs to be guaranteed that there is at least one non-target image between two target images.

Step 3-2: a user sits straight before a screen; an experiment is started after device preparation is completed, and EEG data is collected. There is a fixation time of 5 s before each trial starts, allowing the user to pay attention. After the trial starts, each stimulus image is presented for 500 ms. After each trial ends (i.e., 110 images in the trial are presented completely), the user takes a rest for 10 s. The user is allowed to take a rest for any duration between two test blocks until the user thinks that next test block can continue.

Step 3-3: the collected EEG data for the two test blocks is preprocessed. A 2-40 Hz band-pass filter is used to remove a voltage drift and high-frequency noise in the EEG signal, and the EEG signal is downsampled to 100 Hz. An EEG signal with a duration of 1 s starting from presentation of each stimulus image is intercepted as a sample from the downsampled EEG signal. For the two test blocks, a total of 2200 samples are obtained, and dimensions of the EEG data are (2200, 62, 100), where 62 is the number of channels, and 100 is the number of sampling points.

Step 3-4: the EEG classification model based on deep learning is established to perform binary classification on an EEG signal. Since a ratio of target stimulus images to non-target stimulus images is 1:10, EEG signals are in a long-tailed distribution. The problem of category imbalance will have a significant impact on the performance of the model, leading to poor performance of the classifier on a tail category. Since high-quality representation learning is not affected by the problem of category imbalance, the EEG classification model is trained by way of decoupling representation learning, where the training of the EEG classification model is divided into two phases. A feature extractor is trained at a first phase, and a classifier is trained at a second phase.

The training the EEG classification model in step 3-4 includes the following steps.

Step 3-4-1: a triplet sample is constructed. To train the feature extractor using a triplet loss function, a triplet needs to be constructed as a training sample, which is in the following form:

Triplet(anchor, positive, negative)

where anchor sample and positive sample belong to a same category, and negative sample belongs to another category. An EEG data sample space is defined as $X \in \mathbb{R}^{N \times T \times C}$, where N represents a number of samples; T represents a number of sampling points; and C represents a number of channels of the EEG data. Three samples $x_1, x_2, x_3 \in \mathbb{R}^{T \times C}$ are randomly drawn from X; $x_1$ and $x_2$ serve as the anchor sample and the positive sample, respectively, and $x_3$ serves as the negative sample. A total of 10,000 triplet samples are constructed, where the anchor samples in 5,000 samples are target samples, and the anchor samples in the remaining 5,000 samples are non-target samples.

Step 3-4-2: the feature extractor is trained to extract spatiotemporal information of the EEG data. The feature extractor is composed of a multilayer perceptron and a recurrent network layer and configured to extract the spatiotemporal information of the EEG data. The multilayer perceptron is constructed by connecting four fully connected layers, an exponential linear unit (ELU) activation function, and a residual, and configured to fuse channel information of the EEG data. The recurrent network layer is a long short-term memory (LSTM) network. The recurrent network layer is configured to extract a timing activity feature of each space source in the EEG data. The anchor sample, the positive sample, and the negative sample are defined as the samples $x_1, x_2, x_3$, respectively. For each triplet sample $x=\{x_{anchor}, x_{positive}, x_{negative}\} \in \mathbb{R}^{T \times C}$, a feature h output by the feature extractor is defined as:

$$\bar{x}_i = \sigma[W_2\sigma(W_1x_i) + x_i]$$

$$\hat{x}_i = \sigma[W_4\sigma(W_3x_i) + \bar{x}_i]$$

$$h_i = LSTM(\hat{x}_i)$$

where $W_1 \in \mathbb{R}^{C \times C}$, $W_2 \in \mathbb{R}^{C \times C_1}$, $W_3 \in \mathbb{R}^{C \times C_1}$, and $W_4 \in \mathbb{R}^{C \times C_1}$ represent weights of the fully connected layers; σ represents the ELU activation function; $x_i$ represents an element in the triplet sample, i=anchor, positive, negative; and $\bar{x}_i$ and $\hat{x}_i$ represent an intermediate layer output and a final output of the multilayer perceptron, respectively.

The obtained feature h is flatten and a projection layer is used to map the feature h to a low-dimensional sample space. The projection layer is merely configured to train the feature extractor and is not involved in model classification. The projection layer $$h_i'$$

is expressed as:

$$h_i' = W_6ELU(W_5h_i + b_5) + b_6$$

where $W_5 \in \mathbb{R}^{C_1 T \times 64}$, $W_6 \in \mathbb{R}^{64\times 16}$, $b_5$, and $b_6$ represent weights of the projection layer. A similarity between the feature projections $$h'_i$$

of different samples is calculated using paired distances, where the similarity dis(a, b) between the feature projections a and b of any two samples of the triplet sample is expressed as:

$$dis(a, b) = \|a - b + \epsilon e\|_2$$

where $\in$ represents a preset small value close to 0, which is $1\times10^{-6}$; and e represents an all-one vector (i.e., a vector having all elements being 1).

Subsequently, the feature extractor is trained using the triplet loss function, where the triplet loss function L is defined as follows:

$$L = \max\{dis(h'_{anchor}, h'_{positive}) - dis(h'_{anchor}, h'_{negative}) + \text{margin}, 0\}$$

where margin represents a minimum distance between positive and negative samples, which is set to 2.

Step 3-4-3: the training sample is resampled to train the classifier. Since a ratio of a number of non-target samples to a number of target samples is 10:1, there is a serious problem of category imbalance. Therefore, a downsampling method is used to randomly select samples from the non-target samples such that the number of the non-target samples is equal to the number of the target samples. A number of samples in an EEG data sample space X after resampling is M.

Step 3-4-4: the classifier is trained. The classifier is composed of one fully connected layer, defined as follows:

$$\hat{y} = W_0 x + b_0$$

where ŷ represents a predicted label of the classifier; $W_0$ represents a weight matrix; and $b_0$ represents a bias term.

Parameters of the feature extractor trained in step 3-4-2 are frozen such that the feature extractor is not involved in classifier training. The classifier is trained by minimizing a cross-entropy loss function, as shown in the following formula:

$$\min_{\delta} L = \sum_{i=1}^{M} -y_i \cdot \log(\hat{y}_i)$$

where $\hat{y}_i$ represents a predicted label of the classifier for the ith sample; y represents a true label of the ith sample; and M represents the number of samples in the EEG data sample space X after resampling. The classifier is trained using an Adam optimizer, and a learning rate is set to 0.0001.

Step 4: target retrieval from the videos is performed based on human-machine collaboration.

Step 4-1: the cropped images identified by the target detection model in step 2-2 are prescreened by using the reidentification model in step 1-2 according to a coarse-grained feature of the target provided by a user to reduce the workload of artificial screening. The reidentification model may output n cropped images which are most possibly the target in sequence from a high confidence level to a low confidence level. The corresponding video frame images are found according to the naming manner in step 2-2.

Step 4-2: the video frame images screened in step 4-1 are disordered and then made into the RSVP paradigm for presentation for the user, where the setting of the RSVP paradigm is consistent with that in step 3-2. An EEG signal and eye movement information need to be recorded while the user views the video frame images. The collected EEG signal is preprocessed in a same way with step 3-3. The processed EEG signal is input to the EEG classification model obtained in step 3-4. If the output of the EEG classification model is 1, the video frame image includes the target, and the eye movement data of a corresponding time period is processed.

The processing eye movement data in step 4-2 specifically includes the following steps.

Step 4-2-1: human visual attention may guide eyeballs to move. Eyeball movement data acquired by an eye tracker can be analyzed in real time into fixation or saccade. Fixation means focusing attention on a target of interest, and saccade means change and diversion of attention. Therefore, for the acquired eye movement data, the saccade part thereof may be rejected. A region around a fixation point is a region of interest, namely a region in which the target is present. Fixation points in original eye movement data are extracted using a dispersion-threshold identification (I-DT) algorithm and identified as a set of continuous points within a particular dispersion degree.

The extracting fixation points include: firstly rank eye movement points in a sequence of time and then use a sliding window to scan continuous eye movement points. An initial size of the sliding window is determined by a duration threshold. In the present embodiment, the initial size of the window is set to 35 ms. A dispersion degree D of the eye movement points within the sliding window may be calculated using the I-DT algorithm by the following formula:

$$D = [\max(x) - \min(x)] + [\max(y) - \min(y)]$$

where max(x) and min(x) represent horizontal coordinates of a leftmost eye movement point and a rightmost eye movement point within a plane, and max(y) and min(y) represent vertical coordinates of an uppermost eye movement point and a lowest eye movement point within the plane.

If the dispersion degree is less than a threshold, next eye movement point is added to the sliding window until the dispersion degree is greater than the threshold. At this time, average values of coordinates of the eye movement points in the sliding window are calculated, and calculation results are coordinates of one fixation point. When the dispersion degree is greater than the threshold, the sliding window is moved rightwards and a separation degree is recalculated. The process is repeated until scanning of all the eye movement points is completed.

Step 4-2-2: a Euclidean distance of every two fixation points of the fixation points extracted in step 4-2-1 is calculated and a plurality of regions of interest are generated using a density-based clustering algorithm according to the following formula:

$$d(F_i, F_j) = \sqrt{(x_i - x_j)^2 + (y_i - y_j)^2}$$

where $F_i$ and $F_j$ represent two different fixation points; $(x_i, y_i)$ and $(x_j, y_j)$ represent coordinates of the fixation points $F_i$ and $F_j$, respectively. If a distance d between two fixation points is less than a threshold $d_\in$, the coordinates of the two fixation points are averaged to generate a new fixation point.

Step 4-2-3: a plurality of regions of interest may be generated in one stimulus image, and a region which is most possibly the target needs to be selected. Since visual search is a process, the possibility of the user focusing on the target is greater as time goes on. Therefore, a last generated region of interest is selected as a target region.

Step 4-2-4, target location based on human vision may have a deviation. That is, the region of interest is incapable of exactly framing the target. Therefore, in combination with the Faster R-CNN target detection model in step 1-1, a framed region provided by the Faster R-CNN target detection model with a target region determined by the human vision; the framed region closest to the target region determined by the human vision is selected as a final target region, and the final target region is added to the candidate target set. The image is cropped according to coordinates of the framed region, and the cropped image is saved locally. The image is named as: candidate target_current serial number.jpg.

Step 4-3: there may be a false alarm in the candidate targets obtained in step 4-2. That is, non-target is regarded as the target. Therefore, a plurality of target images finally needing to be retrieved are selected from the candidate target set by artificial screening.

Step 4-4: a feature is extracted from each target image obtained in step 4-3 using the reidentification model in step 1-2, and a similarity match between the extracted feature and a feature library saved in step 2-3 is calculated to obtain a similarity score. The higher the score, the more similar two feature vectors. A similarity between feature vectors is measured using a cosine similarity by the following formula 5:

$$\text{similarity}(A, B) = \cos(\theta) = \frac{A \cdot B}{\|A\|\|B\|} \quad \#(5)$$

where A and B represent two feature vectors with 512 dimensions, and $\|\cdot\|$ represents a module length of a vector.

The similarity scores are ranked from high to low, and image features having a similarity of greater than 90 to the feature of any target image in a database are selected. Image names corresponding to all the image features selected are found according to the dictionary described in step 2-3, and the video names and the current frame numbers in the image names are cropped according to the naming manner in step 2-2. Corresponding video clips are found according to the video names and the frame numbers to realize target location and tracking.

What is claimed is:

1. A method for complex target identification from monitoring videos based on human-machine collaboration, comprising the following steps:

step 1: establishing and training a target detection model and a reidentification model;

step 2: preprocessing the monitoring videos; extracting video frame images from retrieved monitoring video data; performing detection analysis on the video frame images using the target detection model, and framing and clipping a plurality of targets in the video frame images to obtain cropped images; and extracting a feature of each target of the target plurality of targets in the cropped images using the reidentification model;

step 3: establishing and calibrating electroencephalogram (EEG) classification model; and determining, by the EEG classification model, whether a user from which an EEG signal is collected observes a target of interest; and step 4: performing target retrieval from the monitoring videos based on human-machine collaboration, specifically comprising:

step 4-1, prescreening, by using the reidentification model, the cropped images identified by the target detection model according to a coarse-grained feature of the target of interest; selecting a cropped images according to a confidence level by the reidentification model; and extracting the video frame images corresponding to the n selected cropped images;

step 4-2, providing the video frame images obtained after the prescreening in step 4-1 for viewing by the user; recording an EEG signal and eye movement information while the user views the video frame images; preprocessing the obtained EEG signal and then inputting the preprocessed EEG signal to the EEG classification model; when the EEG classification model determines that the user observes the target of interest, processing eye movement data of the user, extracting regions of interest for the user from the video frame images; and extracting a candidate target set from the regions of interest;

step 4-3, selecting a plurality of target images finally needing to be retrieved from the candidate target set obtained in step 4-2; and step 4-4, extracting a feature from each target image obtained in step 4-3 using the reidentification model, and performing similarity matching on the feature extracted from each target image and the feature of each target of the plurality of targets in the cropped images; and taking each video frame image corresponding to the feature having a similarity exceeding a threshold as an image in which the target of interest is present.

2. The method for complex target identification from the monitoring videos based on human-machine collaboration according to claim 1, wherein the target detection model in step 1 is a Faster region-based convolutional neural network (R-CNN) model retrained with a common target in context (CoCo) dataset.

3. The method for complex target identification from the monitoring videos based on human-machine collaboration according to claim 1, wherein the reidentification model in step 1 is a ResNet50 model; and an average pooling layer in the ResNet50 model is changed to an adaptive average pooling layer.

4. The method for complex target identification from monitoring videos based on human-machine collaboration according to claim 1, wherein dimensions of a feature vector of the reidentification model are 512.

5. The method for complex target identification from the monitoring videos based on human-machine collaboration according to claim 1, wherein step 3 specifically comprises:

step 3-1: preparing stimulus images of a plurality of test blocks in advance, wherein each test block comprises a plurality of trials, and each trial comprises a plurality of images;

step 3-2: presenting the stimulus images for the user and collecting EEG data;

step 3-3: preprocessing the collected EEG data; and step 3-4: establishing the EEG classification model based on deep learning to perform binary classification on an EEG signal; training the EEG classification model by way of decoupling representation learning, wherein the training of the EEG classification model is divided into two phases; a feature extractor is trained at a first phase, and a classifier is trained at a second phase.

6. The method for complex target identification from the monitoring videos based on human-machine collaboration according to claim 5, wherein among the images of each trial in step 3-1, a ratio of a number of stimulus images comprising the target of interest to a number of stimulus images comprising no target of interest is 1:10.

7. The method for complex target identification from the monitoring videos based on human-machine collaboration according to claim 5, wherein in step 3-2, there is a fixation time of 5 s before each trial starts; after each trial starts, each stimulus image is presented for 500 ms; after each trial ends, the user takes a rest for 10 s; the user is allowed to take a rest for any duration between two test blocks; and when the stimulus images are presented for the user, at least one stimulus image comprising no target of interest is presented between two adjacent stimulus images comprising the target of interest.

8. The method for complex target identification from the monitoring videos based on human-machine collaboration according to claim 5, wherein the preprocessing in step 3-3 comprises: using a 2-40 Hz band-pass filter to remove a voltage drift and high-frequency noise in the EEG signal, and downsampling the EEG signal to 100 Hz; and intercepting as a sample an EEG signal with a duration of 1 s starting from presentation of each stimulus image from the downsampled EEG signal.

9. The method for complex target identification from the monitoring videos based on human-machine collaboration according to claim 5, wherein the training the EEG classification model in step 3-4 comprises:

step 3-4-1: constructing a triplet sample, wherein to train the feature extractor using a triplet loss function, a triplet needs to be constructed as a training sample $x=\{x_{anchor}, x_{positive}, x_{negative} \in \mathbb{R}^{T\times C}$; $x_{anchor}$ sample and $x_{positive}$ sample belong to a same category; and $x_{negative}$ sample belongs to another category;

step 3-4-2: training the feature extractor to extract spatiotemporal information of the EEG data, wherein the feature extractor is composed of a multilayer perceptron and a recurrent network layer; the multilayer perceptron is constructed by connecting four fully connected layers, an exponential linear unit (ELU)

activation function, and a residual; and the recurrent network layer is a long short-term memory (LSTM) network;

a feature houtput by the feature extractor is:

$$\overline{x_i} = \sigma[W_2\sigma(W_1x_i) + x_i]$$

$$\hat{x}_i = \sigma[W_4\sigma(W_3x_i) + \overline{x_i}]$$

$$h_i = LSTM(\hat{x}_i)$$

wherein $W_1 \in \mathbb{R}^{C\times C}$, $W_2 \in \mathbb{R}^{C\times C_1}$, $W_3 \in \mathbb{R}^{C\times C_1}$, and $W_4 \in \mathbb{R}^{C\times C_1}$ represent weights of the fully connected layers; σ represents the ELU activation function; $x_i$ represents an element in the triplet sample, i=anchor, positive, negative; and $\bar{x}_i$ and $\hat{x}_i$ represent an intermediate layer output and a final output of the multilayer perceptron, respectively;

planarizing the feature h and using a projection layer to map the feature h to a low-dimensional sample space to obtain a feature projection $$h_i'$$

as follows:

$$h_i' = W_6ELU(W_6h_i + b_6) + b_6$$

wherein $W_5 \in \mathbb{R}^{C_1T\times 64}$, $W_6 \in \mathbb{R}^{64\times 16}$, $b_5$, and $b_6$ represents a weight of the projection layer; calculating a similarity between the feature projections $$h_i'$$

of different samples, wherein the similarity dis(a, b) between the feature projections a and b of any two samples of the triplet sample is expressed as:

$$dis(a, b) = \|a - b + \epsilon e\|_2$$

wherein ∈ represents a preset parameter; and e represents an all-one vector; and training the feature extractor using the triplet loss function, wherein the triplet loss function L is defined as follows:

$$L = \max\{dis(h_{anchor}', h_{positive}') - dis(h_{anchor}', h_{positive}') + \text{margin}, 0\}$$

wherein margin represents a minimum distance between positive and negative samples;

step 3-4-3: resampling the training sample; and step 3-4-4: training the classifier, wherein the classifier is composed of one fully connected layer, defined as follows:

$$\hat{y} = W_n x + b_n$$

wherein y represents a predicted label of the classifier; $W_0$ represents a weight matrix; and $b_0$ represents a bias term; and training the classifier by minimizing a cross-entropy loss function, as shown in the following formula:

$$\min_{\delta} L = \sum_{i=1}^{M} -y_i \cdot \log(\hat{y}_i)$$

wherein $\hat{y}_i$ represents a predicted label of the classifier for the ith sample; y represents a true label of the ith sample; and M represents a number of samples in an EEG data sample space X after resampling; and the classifier is trained using an Adam optimizer.

10. The method for complex target identification from the monitoring videos based on human-machine collaboration according to claim 1, wherein the processing eye movement data in step 4-2 specifically comprises:

step 4-2-1: extracting fixation points in original eye movement data and identifying the fixation points as a set of continuous points within a particular dispersion degree;

wherein the extracting fixation points comprises: firstly ranking eye movement points in a sequence of time and then using a sliding window to scan continuous eye movement points; determining an initial size of the sliding window by a duration threshold, and calculating a dispersion degree D of the eye movement points within the sliding window by the following formula:

$$D = [\max(x) - \min(x)] + [\max(y) - \min(y)]$$

wherein max(x) and min(x) represent horizontal coordinates of a leftmost eye movement point and a rightmost eye movement point within a plane, and max(y) and min(y) represent vertical coordinates of an uppermost eye movement point and a lowest eye movement point within the plane;

if the dispersion degree is less than a threshold, adding next eye movement point to the sliding window until the dispersion degree is greater than the threshold; at this time, calculating average values of coordinates of the eye movement points in the sliding window as coordinates of one fixation point; when the dispersion degree is greater than the threshold, moving the sliding window rightwards and recalculating a separation degree; and repeating the process until scanning of all the eye movement points is completed;

step 4-2-2: calculating a Euclidean distance of every two fixation points of the fixation points extracted in step 4-2-1 and generating a plurality of regions of interest using a density-based clustering algorithm according to the following formula:

$$d(F_i, F_j) = \sqrt{(x_i - x_j)^2 + (y_i - y_j)^2}$$

wherein $F_i$ and $F_j$ represent two different fixation points; $(x_i,y_i)$ and $(x_j,y_j)$ represent coordinates of the fixation points $F_i$ and $F_j$, respectively; and if a distance d between two fixation points is less than a threshold $d_c$, averaging the coordinates of the two fixation points to generate a new fixation point;

step 4-2-3: for each stimulus image, selecting a last generated region of interest as a target region determined by human vision; and step 4-2-4: comparing a framed region identified by the target detection model with the target region determined by the human vision, selecting the framed region closest to the target region determined by the human vision as a final target region, and adding the final target region to the candidate target set.

* * * * *